(12) United States Patent
Cho

(10) Patent No.: US 6,430,371 B1
(45) Date of Patent: Aug. 6, 2002

(54) RING LIGHT GUIDE DEVICE FOR CAMERA

(76) Inventor: Sung Hwan Cho, 4-309 Kumho APT, 495-5 Gansuk-dong, Namdong-gu, Inchon (KR)

( * ) Notice: Subject to any disclaimer, the term of this patent is extended or adjusted under 35 U.S.C. 154(b) by 0 days.

(21) Appl. No.: 09/534,169

(22) Filed: Mar. 24, 2000

(30) Foreign Application Priority Data

Mar. 24, 1999 (KR) ............................................. 99-10113

(51) Int. Cl.⁷ ............................................... G03B 15/03
(52) U.S. Cl. .......................... 396/176; 396/14; 396/199
(58) Field of Search ............................. 396/16, 17, 19, 396/71, 267, 199, 176, 14, 106, 189, 190

(56) References Cited

U.S. PATENT DOCUMENTS

| | | | | |
|---|---|---|---|---|
| 4,085,436 A | * | 4/1978 | Weiss | 362/16 |
| 4,855,770 A | * | 8/1989 | Mauchan et al. | 396/544 |
| 4,987,433 A | * | 1/1991 | Gandrud | 396/190 |
| 5,278,012 A | * | 1/1994 | Yamanaka et al. | 430/30 |
| 5,345,284 A | * | 9/1994 | Tsuruta | 396/190 |
| 5,541,686 A | * | 7/1996 | Stephenson | 396/164 |

\* cited by examiner

*Primary Examiner*—Russell Adams
*Assistant Examiner*—Arthur A Smith
(74) *Attorney, Agent, or Firm*—Griffin & Szipl, P.C.

(57) ABSTRACT

Disclosed is a ring light guide device for a camera. The ring light guide device comprises a housing having an adaptor inserting hole which is formed therethrough at a side thereof in a manner such that the adaptor inserting hole has an axis which is coaxial with a center axis of a lens of the camera, the housing being detachably coupled on a rear surface thereof with a camera fitting adaptor by the fact that the camera fitting adaptor is inserted into the adaptor inserting hole, light receiving section installed opposite to a light source of the camera, for receiving light which is emitted from the light source; light path changing section for changing a path of light received by the light receiving section in a manner such that the light is irradiated toward an object in a direction which is substantially parallel to the center axis of the lens of the camera; and irradiation adjusting section for adjusting an amount of light which is irradiated to the object, depending upon a camera-to-object distance.

17 Claims, 7 Drawing Sheets

RING LIGHT GUIDE DEVICE FOR CAMERA

This application claims priority on Korean Patent Application No. 99-10113, filed Mar. 24, 1999, the entire disclosure of which is incorporated herein by reference.

BACKGROUND OF THE INVENTION

1. Field of the Invention

The present invention relates to a ring light guide device for a camera, and more particularly, the present invention relates to a ring light guide device for a camera, which can align a position of a light source and a photographing direction of a lens of the camera on the same straight line and adjust an amount of light emitted from the light source depending upon a camera-to-object distance, thereby preventing a shaded region from being formed on an object upon photographing, and which can filter light irregularly reflected in the course of photographing any particular part of the body of a hospital patient especially when such body part includes a liquid constituent, thereby preventing the affected body part from being imaged more brightly than other parts, that is, to have a white color.

2. Description of the Related Art

Generally, when it is necessary to enlargedly image a small object such as an insect, flower or the like, contact or close-up photography is implemented. Also, in order to precisely inspect mechanical or electronic components for a defect in the course of the manufacture thereof along an assembling line, the components are imaged by contact photography using a high performance camera, and then, based on developed photographs, a defect and a location thereof are determined.

Further, when it is difficult to directly see an ill-affected body part of a medical patient with the naked eye, due to an internal injury rather than an external injury, that is, as in medically treating a patient in a dental clinic, the inside of the oral cavity of the patient is precisely photographed, and a status of the affected part is grasped based on photographs which are obtained by this photography. Moreover, in the case of medically examining a patient in obstetrics and gynecology, a cervical region of the uterus of the patient, for example, is photographed with a camera, and based on obtained photographs, whether a uterine disease is developed and if developed, a degree of the development may be determined.

However, in the conventional art, as can be clearly seen from FIG. 1, in the case that a mechanical component 10 which is formed with a prominence and depression or a recessed portion, is photographed, because a flash 5 of a camera 1 is located at a predetermined separation from a lens 3, that is, the flash 5 of the camera 1 is not arranged on a photographing direction of the lens 3, a shaded region S results in the prominence and depression or the recessed portion of the mechanical component 10. Therefore, since the shaded region S is more darkly imaged than other regions on the resultant photograph, it is difficult to precisely know a status of the component 10.

On the other hand, when a patient is photographed in a hospital, in most cases, the ill body part of the patient includes a liquid constituent such as saliva which irregularly reflects light. If such a body part is photographed in a state wherein the liquid constituent is not removed and a resultant film is developed, on the affected part including the liquid constituent, light which is emitted from a light source, is irregularly reflected by the liquid constituent toward a lens. Consequently, because, on the photograph obtained, the affected part is more brightly imaged than other parts, to be white, it is difficult to precisely read out a current status of the affected part.

While an attempt has been made in which a separate large-sized light source is provided integrally with a camera to cope with this problem, in this case, troublesomeness is induced in that a size of a main camera body is remarkably enlarged and it may be necessary to laboriously manipulate the separate large-sized light source.

SUMMARY OF THE INVENTION

Accordingly, the present invention has been made in an effort to solve the problems occurring in the related art, and an object of the present invention is to provide a ring light guide device for a camera, which effectively prevents, by using a flash mounted to the camera and without using a separate light source, a shaded region from being formed on an object upon photographing and enables a photographing operation to be performed at an illumination intensity suited to a camera-to-object distance.

Another object of the present invention is to provide a ring light guide device for a camera, which renders a polarization function to the camera and thereby prevents, when, for example, an affected body part of a medical patient includes a liquid constituent, the affected part from being imaged more brightly than other parts, that is, to have a white color, by filtering irregularly reflected light through polarized filters.

Still another object of the present invention is to provide an adaptor for a camera, which can adjust an amount of light irradiated to an object depending upon a camera-to-object distance and render a polarization function to the camera.

Yet still another object of the present invention is to provide a ring light guide device for a camera, in which a light receiving section coupled to a light source of the camera and a lens coupling section coupled to a lens of the camera are configured in a manner such that they are integrated with or separated from each other.

In order to achieve the above objects, according to one aspect of the present invention, there is provided a ring light guide device for a camera, comprising: a housing having an adaptor inserting hole which is formed therethrough at a side thereof in a manner such that the adaptor inserting hole has an axis which is coaxial with a center axis of a lens of the camera, the housing being detachably coupled on a rear surface thereof with a camera fitting adaptor by the fact that the camera fitting adaptor is inserted into the adaptor inserting hole, light receiving means installed opposite to a light source of the camera, for receiving light which is emitted from the light source; light path changing means for changing a path of light received by the light receiving means in a manner such that the light is irradiated toward an object in a direction which is substantially parallel to the center axis of the lens of the camera; and irradiation adjusting means for adjusting an amount of light which is irradiated to the object, depending upon a camera-to-object distance.

According to another aspect of the present invention, there is provided a ring light guide device for a camera, comprising: light receiving means arranged in front of a light source of the camera for receiving light which is emitted from the light source; light path changing means for changing a path of light received by the light receiving means in a manner such that the light is irradiated toward an object in a direction which is substantially parallel to a center axis of a lens of the camera; and irradiation adjusting means for adjusting an amount of light which is irradiated to the object, depending upon a camera-to-object distance.

The irradiation adjusting means can comprise first and second polarized filters located over an entire light receiving area of the light receiving means for adjusting, depending upon an angle which is defined between their polarization axes, an amount of light to be received by the light receiving means, or first and second polarized filters located at an output side of the light path changing means for adjusting, depending upon an angle which is defined between their polarization axes, an amount of light to be received by the light receiving means, the first and second polarized filters having a ring-shaped configuration.

The irradiation adjusting means can further comprise a third polarized filter located in front of the lens of the camera for receiving only reflected light which is reflected from the object after being irradiated through the first and second polarized filters to the object. In this case, by the fact that the first and second polarized filters are simultaneously rotated along with and relative to the third polarized filter in a state wherein their polarization axes are aligned on the same straight line, it is possible to render a polarization function to the camera.

Moreover, the irradiation adjusting means can comprise a first polarized filter located at an output side of the light path changing means for allowing only one linear polarized light component of light to be irradiated, the first polarized filter having a ring-shaped configuration; and a second polarized filter located in front of the lens of the camera for receiving only reflected light which is reflected from the object after being irradiated through the first polarized filter to the object.

According to another aspect of the present invention, the irradiation adjusting means can comprise a movable member located in front of the light source of the camera in a manner such that the movable member can be moved in forward and rearward directions, the movable member having light receiving means arranged therein; and distance altering means threadedly coupled around a circumferential outer surface of the movable member, for altering a distance between the light source of the camera and the light receiving means.

Further, the irradiation adjusting means can be constructed in a manner such that it automatically adjusts a light irradiation amount depending upon the camera-to-object distance and a brightness of the object, by using an automatic flash control circuit which is arranged inside the camera.

On the other hand, in the case that the ring light guide device further comprises a magnification lens located forward of the lens of the camera for enlarging an incident image to a preset magnification, it is possible to increase a magnification upon implementing a close-up photographing operation.

In this case, the light receiving means and the irradiation adjusting means can be coupled to the camera in a state wherein they are separated from or integrated with each other. In the case of a separation type, the light path changing means can be covered by a flexible bellows tube, whereby optical fibers provided therein are protected and a contour of the optical fibers can be freely varied.

By the features of the present invention, since light is emitted through light path changing means from a multitude of points in directions which are parallel to a photographing direction of a lens, it is possible to prevent a shaded region from being formed on a portion of an object, that is, in a prominence and depression or a recessed portion of a mechanical component. Therefore, the mechanical component can be photographed in a state wherein it does not have any shaded regions, and thereby, a status of the mechanical component can be precisely grasped.

Also, in the case that an ill-affected part of a medical patient, which includes a liquid constituent, is photographed, by filtering irregularly reflected light through polarized filters of a light amount/polarization adjusting section, it is possible to prevent from the affected part from being more brightly imaged than other parts.

BRIEF DESCRIPTION OF THE DRAWINGS

The above objects, and other features and advantages of the present invention will become more apparent after a reading of the following detailed description when taken in conjunction with the drawings, in which:

FIG. 3 is a schematic cross-sectional view taken along the line A—A of FIG. 2a;

DETAILED DESCRIPTION OF PREFERRED EMBODIMENTS

Figure 1:
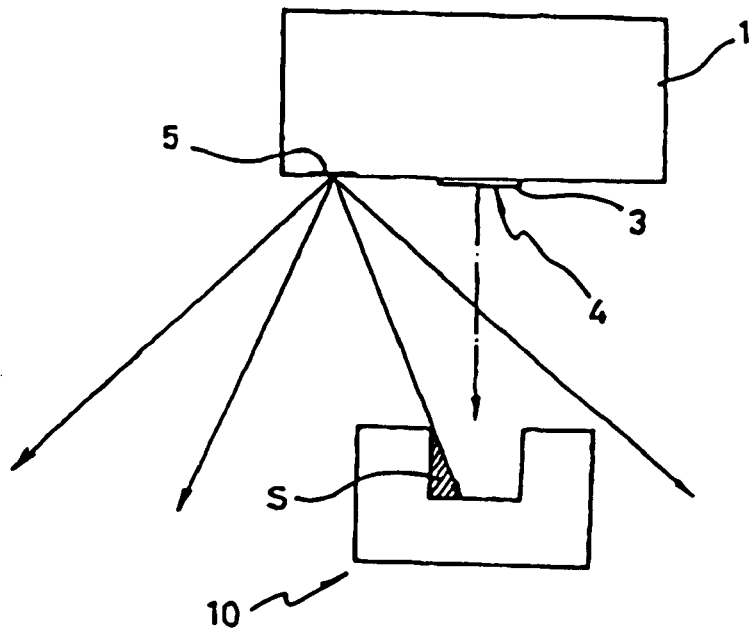
FIG. 1 is a schematic plan view illustrating a state wherein a machine component is photographed using a conventional camera.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2A:
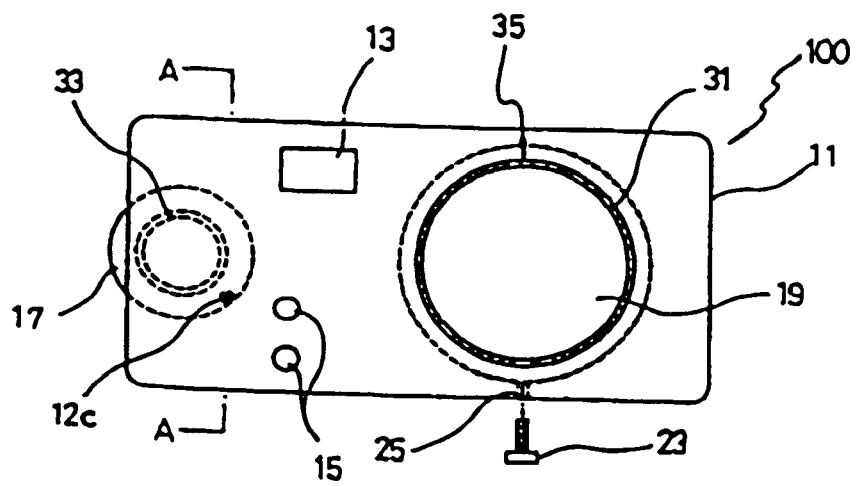
FIGS. 2a, 2b and 2c are respectively a front view, a rear view and a schematic plan view, illustrating a ring light guide device for a camera, in accordance with a first embodiment of the present invention.
Figure 2B:
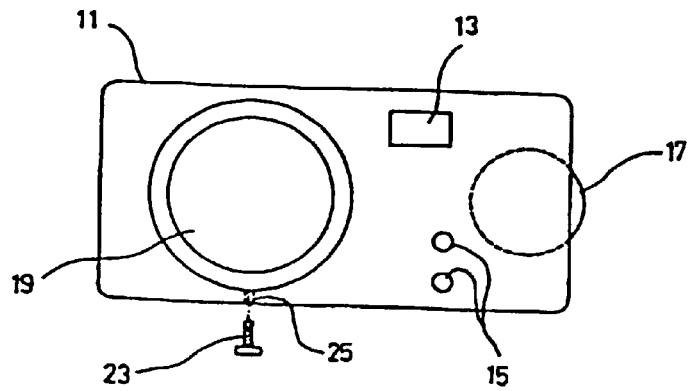
Figure 2C:
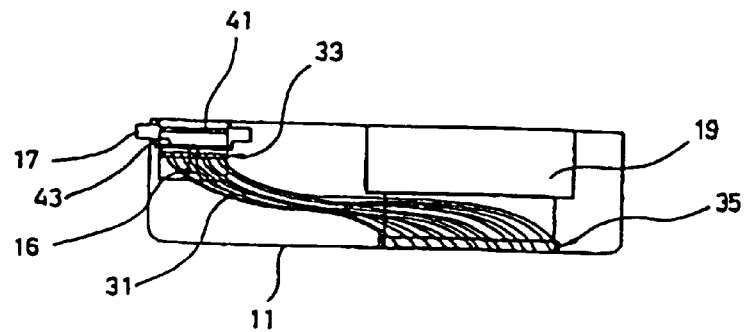
Figure 3:
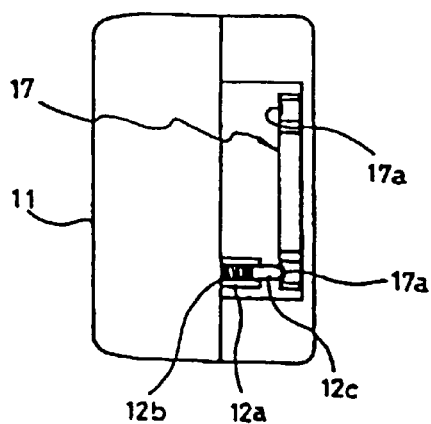
Figure 4:
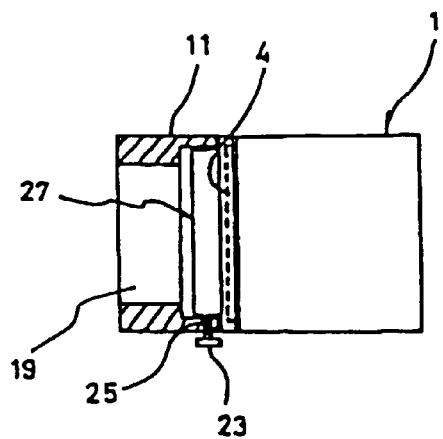
FIG. 4 is a schematic side view illustrating a state wherein a lens of a camera is fitted into a lens fitting hole which is defined in the ring light guide device for a camera according to the present invention.

FIGS. 2a, 2b and 2c are respectively a front view, a rear view and a schematic plan view, illustrating a ring light guide device for a camera, in accordance with a first embodiment of the present invention; FIG. 3 is a schematic cross-sectional view taken along line A—A of FIG. 2a; FIG. 4 is a schematic side view illustrating a state wherein a lens of a camera is fitted into a lens fitting hole which is defined in the ring light guide device for a camera according to the present invention; and FIG. 5 is a schematic view plan view illustrating a state wherein an object is photographed by the camera to which the ring light guide device for a camera according to the present invention is coupled.

Figure 5:
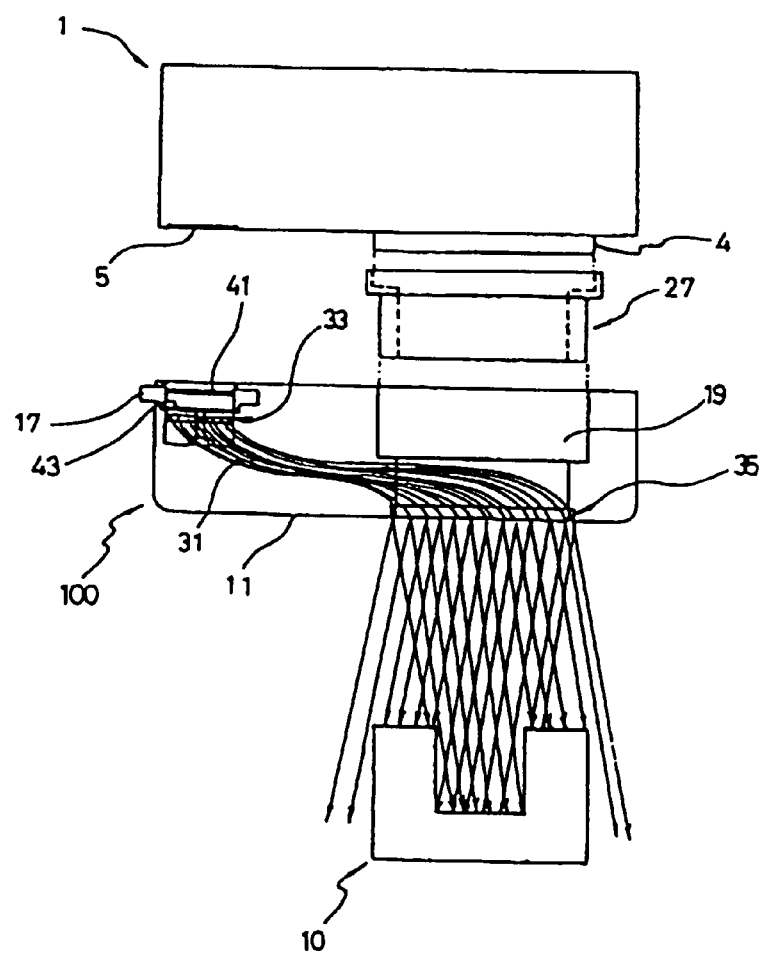
FIG. 5 is a schematic plan view illustrating a state wherein an object is photographed by the camera to which the ring light guide device for a camera according to the present invention is coupled.

First, as shown in FIGS. 2b, 2b and 5, in a ring light guide device in accordance with a first embodiment of the present invention, a housing 11 has an adaptor inserting hole 19 into which a camera fitting adaptor 27 can be detachably inserted. The adaptor inserting hole 19 is formed in a manner such that it extends through front and rear surfaces of the housing 11 at a side of the housing 11. A lower surface of the housing 11 is formed with a fixing hole 25. The fixing hole 25 extends upward in a vertical direction so that it is communicated with the adaptor inserting hole 19.

A fixing bolt 23 can be detachably screwed into the fixing hole 25. As shown in FIG. 4, in the case that the camera fitting adaptor 27 is inserted into the adaptor inserting hole 19, by screwing the fixing bolt 23 into the fixing hole 25, the camera fitting adaptor 27 can be securely fastened to the housing 11.

The camera fitting adaptor 27 is coupled at its rear end with a lens connection ring 4 which is located at a rear end of a hard packing of a camera 1.

A viewfinder passing hole 13 and a distance sensor passing hole 15 are defined in the housing 11 at locations which correspond to those of a viewfinder and a distance sensor, respectively, of the camera 1 when the rear surface of the housing 11 and a front surface of the camera 1 are mated with each other. The viewfinder passing hole 13 and the distance sensor passing hole 15 are formed in a manner such that they extend through the front and rear surfaces of the housing 11.

On the other hand, as shown in FIG. 2c, an adjusting piece 17 is arranged inward of another side on the rear surface of the housing 11. The adjusting piece 17 is rotatably supported by and coupled to the housing 11 through a rotating shaft 16 for adjusting an amount of light which is to be irradiated to an object 10. A first polarization filter 41, that is, a polarizer is rotatably disposed inward of the adjusting piece 17 in a manner such that the first polarized filter 41 can be integrally rotated with the adjusting piece 17 by the rotation of the adjusting piece 17, for filtering light which is emitted from a flash 5 of the camera 1.

Also, a second polarized filter 43, that is, an analyzer is placed in front of the first polarized filter 41. The second polarized filter 43 is securely fixed to the housing 11 for enabling a light irradiation amount to be adjusted by the rotation of the first polarized filter 41.

At this time, as shown in FIG. 3, the adjusting piece 17 is formed with a plurality of fastening grooves 17a. The plurality of fastening grooves 17a are defined on a rear surface of the adjusting piece 17 adjacent to an edge portion of the adjusting piece 17 in a manner such that they are arranged along a circumferential direction. Moreover, an engaging piece 12c is selectively engaged into one of the plurality of fastening grooves 17a. The engaging piece 12c can be engaged into and disengaged from selected one of the plurality of fastening grooves 17a, thereby to fixedly maintain the adjusting piece 17 at a desired polarization angle for adjusting a light irradiation amount depending upon a camera-to-object distance and to allow the adjusting piece 17 to be freely moved. The engaging piece 12c is elastically supported by a spring 12b. The spring 12b and the engaging piece 12c are inserted into a supporting groove 12a which is defined inside the housing 11.

By this arrangement, if the adjusting piece 17 is rotated to reach an angular position which corresponds to a current camera-to-object distance, thereby to adjust a light irradiation amount depending upon a camera-to-object distance, the first polarized filter 41 is rotated in an interlocked manner with the adjusting piece 17. As a result of this, the first polarized filter 41 filters one of a pair of linear polarized light components of the light emitted from the light source, that is, the flash 5 of the camera 1, which moves in directions perpendicular to each other. Then, the light which is primarily filtered by the first polarized filter 41, is secondarily filtered by the second polarized filter 43, whereby it is possible to adjust a receiving amount of light which is emitted from the flash 5 depending upon the camera-to-object distance.

In other words, if polarization axes of the first and second polarized filters 41 and 43 correspond to each other, a maximum amount of light is outputted from the ring light guide device of the present invention, and if the polarization axes of the first and second polarized filters 41 and 43 meet with each other at an right angle, no light can pass through the ring light guide device of the present invention. Using this principle, it is possible to adjust a light irradiation amount.

In this case, because the polarization axes are arranged at a right angle with a cycle of 90, it is preferred that photographing distances, for example, indications of 5, 10, 20, 30 cm are printed along a circumference of the adjusting piece 17 with a cycle of 90. In this connection, by uniformly establishing an interval between two adjoining fastening grooves 17a, an adequate light irradiation operation can be implemented in accordance with the camera-to-object distance.

In the meanwhile, in order to change a path of light which is emitted from the flash 5, a plurality of optical fibers 31 are arranged inside the housing 11. One ends of the plurality of optical fibers 31 are supported by a first supporting ring 33 which is disposed in front of the first polarized filter 21, and the other ends of the plurality of optical fibers 31 are supported by a second supporting ring 35 which is fitted into the adaptor inserting hole 19 at the front end of the housing 11.

Therefore, as shown in FIGS. 4 and 5, in the case that the object 10 is photographed by the camera 1 after the ring light guide device 100 according to the present invention is coupled to the camera 1 using the camera filtering adaptor 27, the plurality of optical fibers 31 receive the light which is adjusted in its irradiation amount through the first and second polarized filters 41 and 43, and thereby, irradiate the light to the object 10 in a multitude of directions which are parallel to a photographing direction of the lens 3 of the camera 1.

By this, when photographing the object 10, for example, a mechanical or electronic component which is formed with a prominence and depression or the like, according to the present invention, a shaded region is not formed on the object 10. Consequently, because a shaded region is prevented from being formed on the object 10, it is possible to precisely grasp, through a photograph, a crack or a defect which is developed in the object 10.

Meanwhile, while it is explained in the above embodiment that the light receiving amount is adjusted using the pair of polarized filters, a person skilled in the art will appreciate that the present invention is not limited to this particular arrangement and therefore, it is possible to cause a predetermined light amount to be always irradiated to the object 10, irrespective of the camera-to-object distance.

Figure 6:
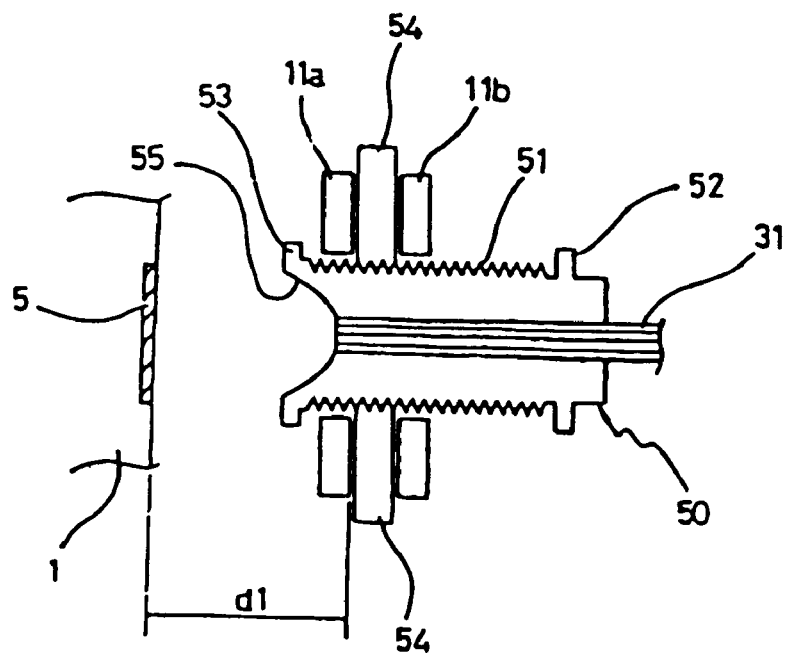
FIG. 6 is a cross-sectional view illustrating a structure for adjusting an amount of received light according to the present invention.

For example, as shown in FIG. 6, it is possible to adjust a distance d1 between the flash 5 of the camera 1 and a light receiving section of the ring light guide device, depending upon the camera-to-object distance.

Referring to FIG. 6, the plurality of optical fibers 31 which constitute the light receiving section, are secured at their one ends to a circumferential inner surface of a movable member 50. The movable member 50 is supported inside the ring light guide device 100 in a manner such that it can be moved in forward and rearward directions. A circumferential outer surface of the movable member 50 is formed with an externally-threaded portion 51, and first and second stopper projections 52 and 53 for limiting a moving distance of the movable member 50 are formed at front and rear ends of the movable member 50.

In addition, the movable member 50 is supported at its circumferential outer surface by a pair of cylindrical holder portions 11a and 11b. The pair of cylindrical holder portions 11a and 11b are integrally formed with the housing 11 in a manner such that they are spaced apart from each other by a predetermined separation. Between the pair of cylindrical holder portions 11a and 11b, an adjusting piece 54 is threadedly coupled to the externally threaded portion 51 of the movable member 50. The adjusting piece 54 is fixedly supported by the pair of cylindrical holder portions 11a and 11b.

Figure 7:
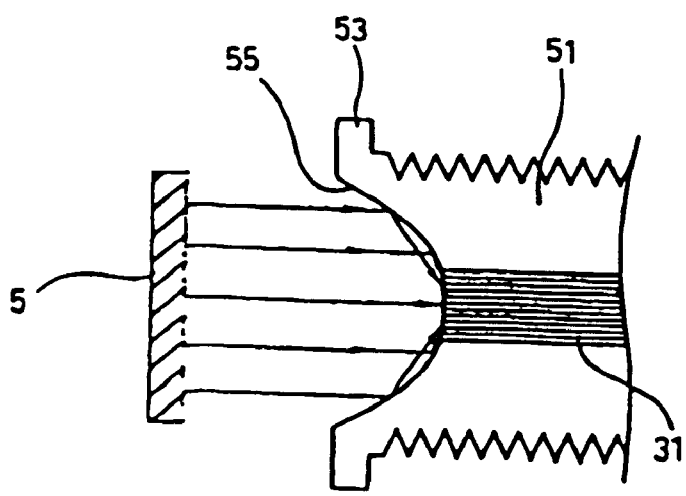
FIG. 7 is an enlarged cross-sectional view of a condensing mirror shown in FIG. 6.

On the other hand, between the one ends of the plurality of optical fibers 31 and the second stopper 53, as can be readily seen from FIG. 7, a cross-sectional profile of a condensing mirror 55 which is applied on its surface with a coating, is defined in such a manner that a collection efficiency of light which is emitted from the flash 5 facing the condensing mirror 55 is elevated. To this end, the condensing mirror 55 is profiled to have an inwardly curved configuration so that light received thereby does not leak out of the condensing mirror 55 and instead, is concentrated to the plurality of optical fibers 31 which are placed at a center portion of the condensing mirror 55.

In the above-described structure of the light receiving section, if the adjusting piece 54 is rotated in a clockwise direction or in a counterclockwise direction, the movable member 50 which is threadedly coupled to a circumferential inner surface of the adjusting piece 54, is moved forward or rearward with respect to the flash 5. Hence, a distance between the flash 5 and the condensing mirror 55 (that is, the optical fibers 31) is altered to adjust the light receiving amount. Thereafter, the light is irradiated in the multitude of directions which are parallel to the photographing direction of the lens 3 of the camera 1.

Figure 8:
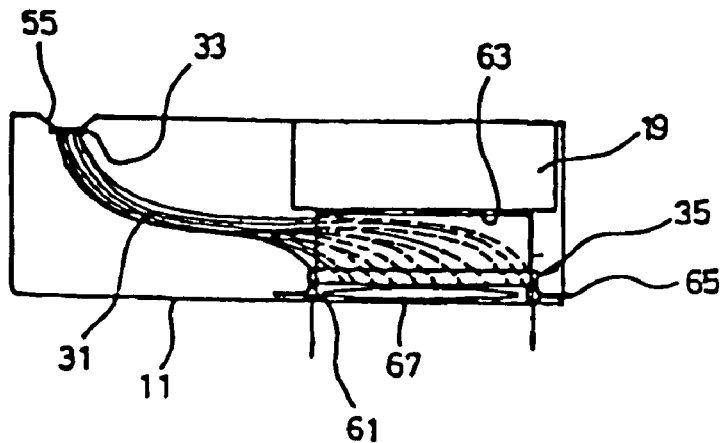
FIG. 8 is a schematic cross-sectional view illustrating a ring light guide device for a camera, which adopts separation type polarized filters, in accordance with a second embodiment of the present invention.

In the meanwhile, a ring light guide device for a camera as shown in FIG. 8 represents a second embodiment of the present invention wherein first and second polarized films are separate from each other by a predetermined distance.

This second embodiment is substantially the same as the first embodiment with the exception of the following differences. That is to say, in the second embodiment, a second polarized filter 63 is placed in the adaptor fitting hole 19 forward of the lens 3 of the camera, and a first polarized filter 61 which is rotatably installed along with an adjusting piece 65 as in the first embodiment, is placed in front of the second supporting ring 35 in a manner such that the first polarized filter 61 has a ring-shaped configuration.

If necessary, by adopting a magnification lens 67 which is composed of a convex lens aligned on an optical axis which is the same as that of the lens 3, it is possible to separately increase an upper magnification of the camera upon implementing a close-up photographing operation, up to 1.5, 2, 2.5 or 3 magnifications.

In this case, the light which is emitted from the flash 5 of the camera, is directly received by the plurality of optical fibers 31 which constitute the light receiving section, and then, this received light is irradiated through the first polarized filter 61 in the multitude of directions which are parallel to the photographing direction of the lens 3.

In this construction of the second embodiment of the present invention, for example, if the object 10 is an ill-affected body part of a medical patient, which includes a liquid constituent, the light which is received through the plurality of optical fibers 31, is irradiated to the ill part in a state wherein one of a pair of linear polarized light components of the light is filtered by the first polarized filter 61 as in the first embodiment.

Thereafter, light which is reflected from the ill part and is incident to the lens 3 through the magnification lens 67 of the ring light guide device 100, is secondarily filtered while passing through the second polarized filter 63. In this case, although the incident light which is redirected toward the lens 3 of the camera 1 after being reflected from the ill part of the medical patient, includes outside light which is scattered by an outside illumination source other than the irradiated light, this outside light is removed by the second polarized filter 63.

Namely, in the second polarized filter 63, by selectively passing only the one of the pair of linear polarized light components of the light which is filtered by the first polarized filter 61, outside light is removed. Accordingly, it is possible to prevent the ill-affected body part of the medical patient from being more brightly imaged by the outside light than other parts, whereby photographing of high resolution and high magnification can be implemented.

Figure 9:
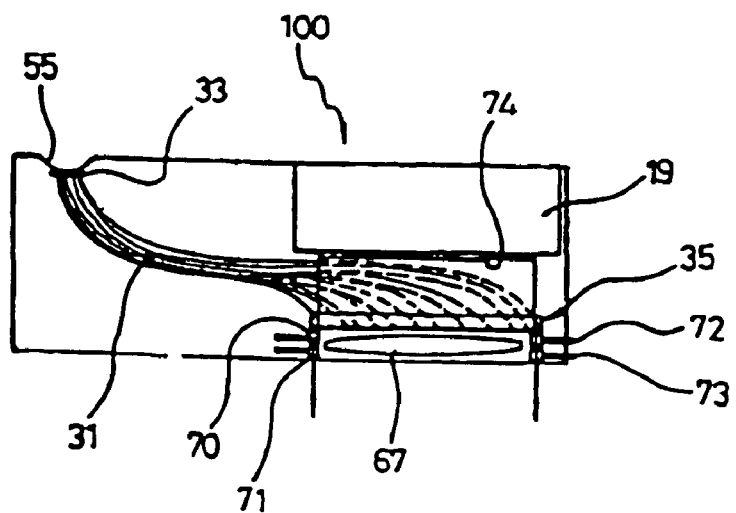
FIG. 9 is a schematic cross-sectional view illustrating a ring light guide device for a camera, which adopts separation type polarized filters, in accordance with a third embodiment of the present invention.

In the meanwhile, as in a third embodiment of the present invention as shown in FIG. 9, it is possible to replace the first polarized filter 61 of the second embodiment with a pair of polarized filters 70 and 71 which are similar to those of the first embodiment.

In this case, the first and second polarized filters 70 and 71 which have the ring-shaped configuration, are rotatably supported by the housing 11 in a state wherein a pair of adjusting pieces 72 and 73 are fixed around the first and second polarized filters 70 and 71, respectively. Also, in this third embodiment of the present invention, a third circular polarized filter 74 is disposed rearward of the first polarized filters 70 and 71, similarly to the case of the second embodiment of the present invention. Moreover, this third embodiment can also include the magnification lens 67, as in the second embodiment.

In this third embodiment, between the first and second polarized filters 70 and 71, the second polarized filter 71 is securely maintained, and the first polarized filter 70 is rotated depending upon the camera-to-object distance, whereby an amount of light which is to be irradiated to the object 10 can be constantly adjusted.

In a state wherein the first and second polarized films 70 and 71 are all opened, that is, the polarization axis of the second polarized filter 71 corresponds to the polarization axis of the first polarized filter 70, by rotating the first and second polarized filters 70 and 71 relative to the third polarized filter 74, it is possible to render a conventional camera a polarization function, as described in the second embodiment.

Thus, a user can select a light irradiation amount adjusting function or a polarization function by adjusting the pair of adjusting pieces 72 and 73 of the first and second polarized filters 70 and 71, respectively.

Figure 10:
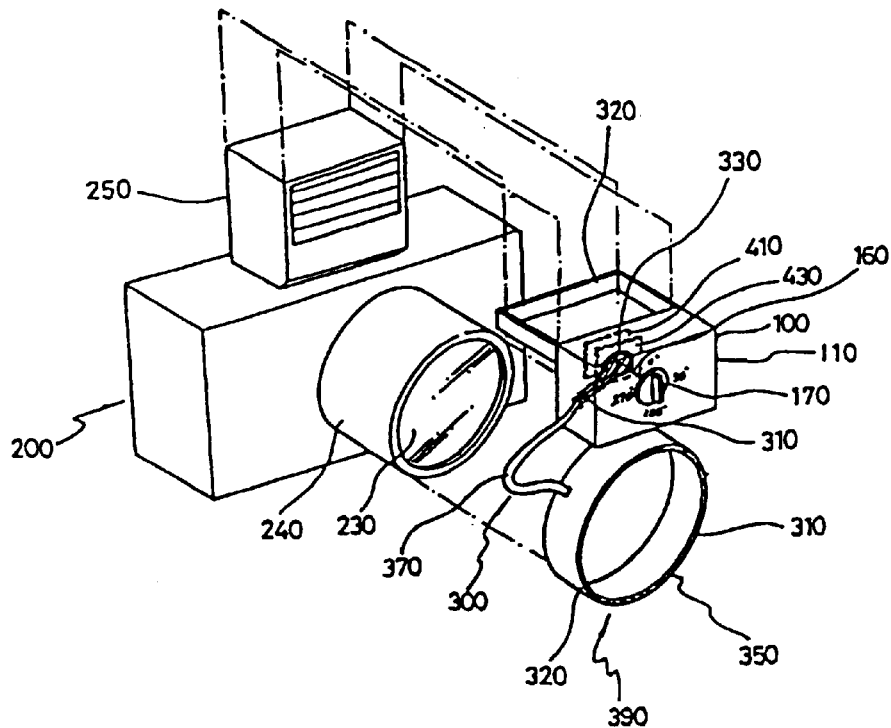
FIG. 10 is a schematic perspective view illustrating a ring light guide device for a camera, having a structure in which a light receiving section and a lens coupling section are split from each other, in accordance with a fourth embodiment of the present invention.
Figure 11:
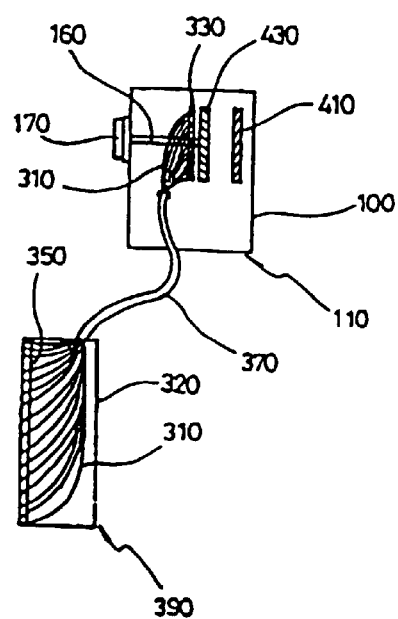
FIG. 11 is a schematic cross-sectional view of the ring light guide device for a camera shown in FIG. 10.

Meanwhile, a fourth embodiment of the present invention as shown in FIGS. 10 and 11, can be effected when implementing precise contact photography of a high magnification by using a high performance and large-sized camera in which a flash is detachably coupled to a central upper end of the camera. In this fourth embodiment of the present invention, a light receiving section and a lens coupling section are separated from each other.

The fourth embodiment is realized by two housings which enable the light receiving section 110 and the irradiation light amount/polarization adjusting section 390 to be separated from each other. The light receiving section 110 and the irradiation light amount/polarization adjusting section 390 are connected with each other by a plurality of optical fibers 310 which are maintained in a state wherein they are inserted into a connection tube 370.

In this case, the light receiving section 110 and the irradiation light amount/polarization adjusting section 390 are structured in a manner such that first and second polarized fibers 430 and 410 having a light irradiation amount adjusting function are located inside the light receiving section 110 as in the first embodiment of the present invention and the light can be irradiated to an object through the irradiation light amount/polarization adjusting section 390.

Except this arrangement, the first and second polarized filters 61 and 63 of the second embodiment can be located in the light irradiation amount/polarization adjusting section 390 to have the light irradiation amount adjusting function, or the first through third polarized filters 70, 71 and 74 of the third embodiment can be located in the light irradiation amount/polarization adjusting section 390 to selectively have the light irradiation amount adjusting function or the polarization function.

Of course, in this case, the light receiving section 110 functions to receive light from the flash 250 of the camera 200 and transmit the light to the light irradiation amount/polarization adjusting section 390.

This fourth embodiment of the present invention includes the light receiving section 110 which detachably coupled to the flash 250 of the camera 200, the light irradiation amount/polarization adjusting section 390 which is detachably coupled to a circumferential outer surface of a lens connecting ring 240, and a light path changing section 300 which includes the plurality of optical fibers 310. The light path changing section 300 functions to change a light path by transmitting the light received through the light receiving section 110 to a plurality of points on the circumferential outer surface of the light irradiation amount/polarization adjusting section 390 in a manner such that light is irradiated to, for example, the ill-affected body part of the medical patient, in the multitude of directions which are parallel to the photographing direction of the lens 230 of the camera 200.

Hereinafter, an example in which the fourth embodiment of the present invention is constructed to have the light irradiation amount adjusting function, similarly to the first embodiment among the three embodiments of the present invention, will be described in detail. First, in the light receiving section 110 according to this fourth embodiment, slightly unlike the first embodiment, an adjusting piece 170 is rotatably coupled to a front surface of the housing and the first polarized filter 430 is constructed in a manner such that it can be integrally rotated in the same direction with the adjusting piece 170 in a state wherein it is interlocked with a rotating shaft 160 of the adjusting piece 170. The second polarized filter 410 cooperates with the first polarized filter 430 for adjusting the light irradiation amount by filtering one of a pair of linear polarized light components of the light emitted from the flash 250 of the camera 200 which move in directions perpendicular to each other.

The light receiving section 110 is formed with a band type coupling frame 320 which enables the light receiving section 110 to be detachably coupled to the flash 250 of the camera 200. In this case, another structure for detachably coupling the light receiving section 110 to the flash 250 can also be embodied within the scope of the present invention.

Also, the light path changing section 300 for changing the path of the light which is received by the light receiving section 110, thereby to enable light to be irradiated to the ill-affected body part of the medical patient as the plurality of points along the circumference of the light irradiation amount/polarization adjusting section 390, is connected at its one end to a side of the light receiving section 110 and at its other end to a side of the light irradiation amount/polarization adjusting section 390. The light path changing section 300 comprises the connection tube 370 which has a hollow shaped contour and the plurality of optical fibers 310 which are inserted at their middle portions into the connection tube 370.

The connection tube 370 is formed in a manner such that it is adequately flexed depending upon a distance between the light receiving section 110 and the light irradiation amount/polarization adjusting section 390 when the light receiving section 110 and the light irradiation amount/polarization adjusting section 390 are coupled with each other so that they correspond to the flash and lens of the camera, respectively. At this time, it is preferred that the connection tube 370 is formed from a metallic bellows tube to effectively protect the plurality of optical fibers 310 which are inserted therein.

In the meanwhile, the plurality of optical fibers 310 are supported at their one ends by a first supporting ring 330 which is positioned in front of the light receiving section 110 and at their other ends by a second supporting ring 350 which is positioned at a front end of the light irradiation amount/polarization adjusting section 390, in a manner such that the light which passes through the first and second polarized filters 410 and 430, is irradiated to the ill-affected body part of the medical patient in the multitude of directions which are parallel to the photographing direction of the lens 230 of the camera 200.

In this variation according to the present invention which can be applied to a large-sized camera wherein a flash and a lens are separated from each other, it is possible to adjust the light irradiation amount by the light receiving section 110 depending upon the camera-to-object (that is, the ill-affected body part of the medical patient). Also, when light irradiated through the light path changing section 300 is reflected by the ill-affected body part including a liquid constituent and then is made incident toward the lens 230 of the camera, because unnecessary outside light except the irradiated light is removed through the third polarized films 63; 74 of the light irradiation amount/polarization adjusting section 390, it is possible to prevent the ill-affected body part from being more brightly imaged than other parts.

In this case, by properly presetting angles of the polarized filters and polarization axes, it is possible to receive light which has a wavelength corresponding to a blue color light. And, by using this separated-type polarized filters, even a fine blood vessel can be photographed.

Figure 12:
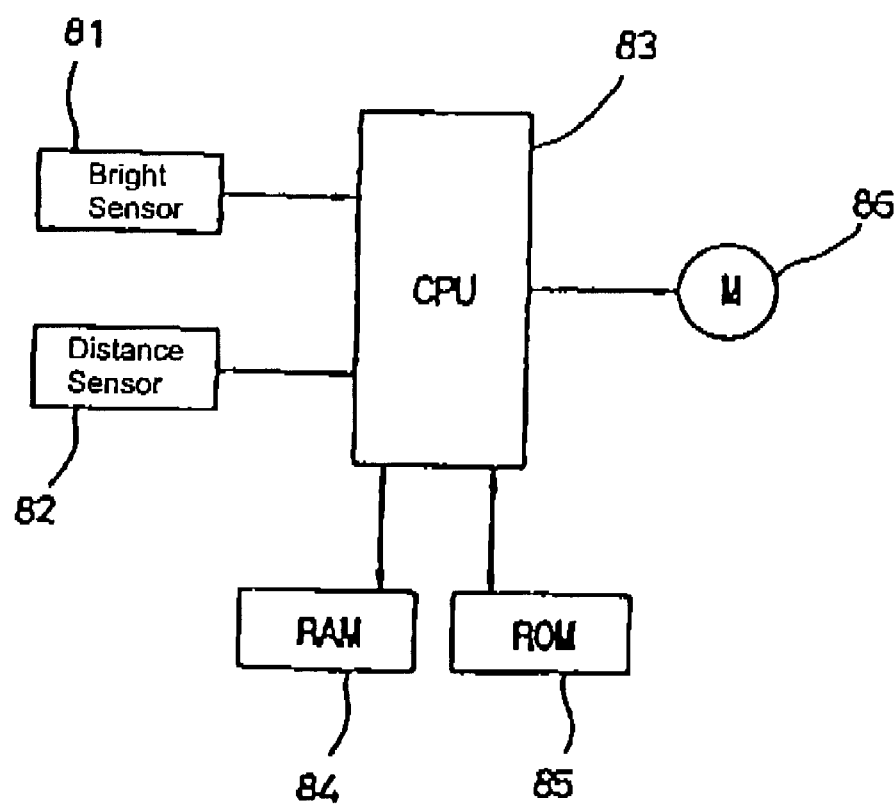
FIG. 12 is a block diagram illustrating an example of an automatic irradiation control circuit which is applied to the ring light guide device according to the present invention.

On the other hand, while it is explained in the above-described embodiments that the light irradiation amount is manually adjusted depending upon the camera-to-object distance, as shown in FIG. 12, it is also possible to automatically set rotating angles of the first and second polarized filters 41, 61, 70, 71, 410, 430, of the first through fourth embodiments, depending upon the camera-to-object distance, by using an automatic flash light amount controlling circuit which is disposed inside the conventional camera.

In other words, in FIG. 12, based on a brightness of the object and a camera-to-object distance which are measured by a bright sensor 81 and a distance sensor 82, respectively, a brightness of light to be irradiated, which is suitable for the camera-to-object distance, is determined by a CPU 83 in accordance with a flash light amount controlling program which is stored in a RON 85, and according to this, by actuating a polarization driving motor 86 for rotating the first and second polarized filters 41, 61, 70, 410, 430, it is possible to automatically adjust the light irradiation amount depending upon the camera-to-object distance.

In FIG. 12, unexplained drawing reference numeral 84 represents a memory for storing data-on-process which is temporarily received while the CPU 83 processes a signal for determining the brightness of the light to be irradiated.

As a result, the ring light guide device for a camera according to the present invention, constructed as mentioned above, provides advantages in that, since light is emitted through light path changing means from a multitude of points in directions which are parallel to a photographing direction of a lens, it is possible to prevent a shaded region from being formed on a portion of an object, that is, in a prominence and depression or a recessed portion of a mechanical component. Therefore, the mechanical component can be photographed in a state wherein it does not have any shaded regions, and thereby, a status of the mechanical component can be precisely grasped.

Also, in the case that an ill-affected part of a medical patient, which includes a liquid constituent, is photographed, by filtering irregularly reflected light through polarized filters of a light amount/polarization adjusting section, it is possible to prevent from the affected part from being more brightly imaged than other parts.

Furthermore, by the fact that a diversity of camera fitting adaptors into which lens connection rings of a variety of cameras are fitted, respectively, are used, the present invention can be applied to a variety of cameras in an easy manner.

In addition, because one polarized filter is located in font of a front end of the lens, the camera can serve as a kind of polarizing camera, whereby it is also possible to use the camera in making miscellaneous contest photographs.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A ring light guide device for a camera, comprising:
a housing having an adaptor inserting hole which is formed therethrough at a side thereof in a manner such that the adaptor inserting hole has an axis which is coaxial with a center axis of a lens of the camera, the housing being detachably coupled on a rear surface thereof with a camera fitting adaptor by the fact that the camera fitting adaptor is inserted into the adaptor inserting hole;
light receiving means installed opposite to a light source of the camera, for receiving light which is emitted from the light source;
light path changing means for changing a path of light received by the light receiving means in a manner such that the light is irradiated toward an object in a direction which is substantially parallel to the center axis of the lens of the camera; and
irradiation adjusting assembly constructed to to adjust an amount of light which is irradiated to the object, depending upon a camera-to-object distance, the irradiation adjusting assembly comprising:
a first polarized filter rotatably installed inside the housing in a manner such that the first polarized filter is opposite to the light source of the camera, for allowing only one linear polarized light component of received light to pass therethrough;
a second polarized filter installed downstream of the first polarized filter, the second polarized filter cooperating with the first polarized filter for determining an amount of the one linear polarized light component which can pass through them; and
an adjusting piece fixed around the first polarized filter in a manner such that the adjusting piece partially projects out of the housing.

2. A ring light guide device for a camera, comprising:
light receiving means arranged in front of a light source of the camera for receiving light which is emitted from the light source;
light path changing means for changing a path of light received by the light receiving means in a manner such that the light is irradiated toward an object in a direction which is substantially parallel to a center axis of a lens of the camera; and
irradiation adjusting means for adjusting an amount of light which is irradiated to the object, depending upon a camera-to-object distance, wherein the irradiation adjusting means comprises:
first and second polarized filters located over an entire light receiving area of the light receiving means for adjusting, depending upon an angle which is defined between their polarization axes, an amount of light to be received by the light receiving means.

3. A ring light guide device for a camera, comprising:
a housing having an adaptor inserting hole which is formed therethrough at a side thereof in a manner such that the adaptor inserting hole has an axis which is coaxial with a center axis of a lens of the camera, the housing being detachably coupled on a rear surface thereof with a camera fitting adaptor by the fact that the camera fitting adaptor is inserted into the adaptor inserting hole;
light receiving means installed opposite to a light source of the camera, for receiving light which is emitted from the light source;
light path changing means for changing a path of light received by the light receiving means in a manner such that the light is irradiated toward an object in a direction which is substantially parallel to the center axis of the lens of the camera; and irradiation adjusting assembly constructed to adjust an amount of light which is irradiated to the object, depending upon a camera-to-object distance, the irradiation adjusting assembly comprising:

a first polarized filter located at an output side of the light path adjusting means, for allowing only one linear polarized light component of irradiated light to pass therethrough, the first polarized filter having a ring-shaped configuration; and a second polarized filter located inside the adaptor inserting hole, for receiving only reflected light which is reflected from the object after being irradiated through the first polarized filter to the object and then for making the reflected light incident to the lens of the camera.

4. A ring light guide device for a camera, comprising:

light receiving means arranged in front of a light source of the camera for receiving light which is emitted from the light source;

light path changing means for changing a path of light received by the light receiving means in a manner such that the light is irradiated toward an object in a direction which is substantially parallel to a center axis of a lens of the camera; and irradiation adjusting means for adjusting an amount of light which is irradiated to the object, depending upon a camera-to-object distance, wherein the irradiation adjusting means comprises:

first and second polarized filters located at an output side of the light path changing means for adjusting, depending upon an angle which is defined between their polarization axes, an amount of light to be received by the light receiving means, the first and second polarized filters having a ring-shaped configuration.

5. A ring light guide device for a camera, comprising:

light receiving means arranged in front of a light source of the camera for receiving light which is emitted from the light source;

light path changing means for changing a path of light received by the light receiving means in a manner such that the light is irradiated toward an object in a direction which is substantially parallel to a center axis of a lens of the camera; and irradiation adjusting assembly constructed to adjust an amount of light which is irradiated to the object, depending upon a camera-to-object distance, the irradiation adjusting assembly comprising:

a first polarized filter located at an output side of the light path changing means for allowing only one linear polarized light component of light to be irradiated, the first polarized filter having a ring-shaped configuration; and a second polarized filter located in front of the lens of the camera for receiving only reflected light which is reflected from the object after being irradiated through the first polarized filter to the object.

6. A ring light guide device for a camera, comprising:

light receiving means arranged in front of a light source of the camera for receiving light which is emitted from the light source;

light path changing means for changing a path of light received by the light receiving means in a manner such that the light is irradiated toward an object in a direction which is substantially parallel to a center axis of a lens of the camera; and irradiation adjusting assembly constructed to adjust an amount of light which is irradiated to the object, depending upon a camera-to-object distance, the irradiation adjusting assembly comprising:

a movable member located in front of the light source of the camera in a manner such that the movable member can be moved in forward and rearward directions, the movable member having light receiving means arranged therein; and distance altering means threadedly coupled around a circumferential outer surface of the movable member, for altering a distance between the light source of the camera and the light receiving means.

7. A ring light guide device for a camera, comprising:

light receiving means arranged in front of a light source of the camera for receiving light which is emitted from the light source;

light path changing means for changing a path of light received by the light receiving means in a manner such that the light is irradiated toward an object in a direction which is substantially parallel to a center axis of a lens of the camera; and irradiation adjusting means for adjusting an amount of light which is irradiated to the object, depending upon a camera-to-object distance, wherein the irradiation adjusting means automatically adjusts a light irradiation amount depending upon the camera-to-object distance and a brightness of the object.

8. The ring light guide device as claimed in claim 1, wherein the light path changing means comprises a bundle of optical fibers.

9. The ring light guide device as claimed in any one of claims 1, 8 or 3, further comprising:

a magnification lens located forward of the lens of the camera for enlarging an incident image to a preset magnification.

10. The ring light guide device as claimed in claims 1 or 3, further comprising:

distance measuring means for measuring the camera-to-object distance;

brightness measuring means for measuring a brightness of the object;

a driving motor for rotatably driving the first polarized filter or the second polarized filter; and controlling means for determining, on the basis of the camera-to-object distance and the brightness of the object, an adequate amount of light which is to be irradiated to the object and thereupon for driving the driving motor.

11. The ring light guide device according to claim 10, further comprising:

a magnification lens located forward of the lens of the camera for enlarging an incident image to a preset magnification.

12. The ring light guide device as claimed in claim 4, wherein the irradiation adjusting means further comprises:

a third polarized filter located in front of the lens of the camera for receiving only reflected light which is reflected from the object after being irradiated through the first and second polarized filters to the object.

13. The ring light guide device as claimed in claim 12, wherein the first and second polarized filters are simultaneously rotated along with and relative to the third polarized filter in a state wherein their polarization axes are aligned on the same straight line.

14. The ring light guide device as claimed in any one of claims 2, 12, 13, or 4–7, wherein the light receiving means and the irradiation adjusting means are coupled to the camera in a state wherein they are separated from each other.

15. The ring light guide device as claimed in claim 14, wherein the light path changing means is covered by a flexible bellows tube.

16. The ring light guide device as claimed in any one of claims 2, 12, 13, or 4–7, further comprising:

a magnification lens located forward of the lens of the camera for enlarging an incident image to a preset magnification.

17. The ring light guide device as claimed in any one of claims 2, 12, 13, or 4–7, further comprising:

a camera fitting adaptor for detachably coupling a guide-path-defining section of a housing for guiding an incident image from the object to the lens of the camera, to a lens connection ring of the camera.

* * * * *